US012634132B2

(12) United States Patent
Kim et al.

(10) Patent No.: US 12,634,132 B2
(45) Date of Patent: May 19, 2026

(54) ELECTRONIC DEVICE FOR CONTROLLING POWER CONSUMPTION OF ACCESSORY DEVICE AND OPERATING METHOD THEREFOR

(71) Applicant: Samsung Electronics Co., Ltd., Suwon-si (KR)

(72) Inventors: Minkyu Kim, Suwon-si (KR); Seungyoun Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 18/319,105

(22) Filed: May 17, 2023

(65) Prior Publication Data

US 2023/0291559 A1      Sep. 14, 2023

Related U.S. Application Data

(63) Continuation of application No. PCT/KR2021/016151, filed on Nov. 8, 2021.

(30) Foreign Application Priority Data

Nov. 26, 2020     (KR) ........................ 10-2020-0161351

(51) Int. Cl.
*H04L 9/30* (2006.01)
*H04W 12/04* (2021.01)
*H04W 76/14* (2018.01)

(52) U.S. Cl.
CPC ............... *H04L 9/30* (2013.01); *H04W 12/04* (2013.01); *H04W 76/14* (2018.02)

(58) Field of Classification Search
None
See application file for complete search history.

(56) References Cited

U.S. PATENT DOCUMENTS 8,805,411  B2     8/2014  Furuta
9,720,854  B2     8/2017  Zahand et al.
(Continued)

FOREIGN PATENT DOCUMENTS

KR            10-1220911  B1      1/2013
KR      10-2016-0047181  A      5/2016
(Continued)

OTHER PUBLICATIONS

Schrader et al.; "Advertising power consumption of Bluetooth low energy systems"; 2016; Retrieved from the Internet https://ieeexplore. ieee.org/abstract/document/7805787; pp. 1-7, as printed. (Year: 2016).*

(Continued)

*Primary Examiner* — Michael W Chao
(74) *Attorney, Agent, or Firm* — Jefferson IP Law, LLP

(57) ABSTRACT

An electronic device is provided. The electronic device includes a wireless communication circuit, a memory, and a processor. The processor may be set to establish a device-to-device connection with an accessory device by using the wireless communication circuit, obtain device information about the accessory device through the device-to-device connection, transmit the device information about the accessory device to at least one server, receive state information about the accessory device from the at least one server, transmit location information about the electronic device to the at least one server in response to the state information, and transmit, to the accessory device through the device-to-device connection, a control command that causes the accessory device to operate in a low power mode.

19 Claims, 11 Drawing Sheets

(56) References Cited

U.S. PATENT DOCUMENTS

| | | | |
|---|---|---|---|
| 10,068,456 B2 | 9/2018 | Cox et al. | |
| 10,089,853 B2 | 10/2018 | Hawkins | |
| 10,197,661 B1 * | 2/2019 | Girimaji | G01S 1/72 |
| 10,219,107 B2 | 2/2019 | Leveque et al. | |
| 10,229,582 B2 | 3/2019 | Cox et al. | |
| 10,271,171 B2 * | 4/2019 | Evans | G06F 21/88 |
| 10,292,012 B1 * | 5/2019 | Yuan | H04W 4/025 |
| 10,362,031 B2 * | 7/2019 | Dawoud Shenouda Dawoud | |
| | | | H04L 9/0825 |
| 10,412,540 B2 | 9/2019 | Leveque et al. | |
| 10,455,519 B1 * | 10/2019 | Liu | H04W 52/245 |
| 10,469,991 B2 | 11/2019 | Evans et al. | |
| 10,506,517 B2 | 12/2019 | Dai Javad et al. | |
| 10,536,798 B2 | 1/2020 | Leveque et al. | |
| 10,600,310 B2 | 3/2020 | Hawkins | |
| 10,609,514 B2 | 3/2020 | Evans et al. | |
| 10,757,672 B1 * | 8/2020 | Knas | H04W 40/244 |
| 11,201,748 B2 | 12/2021 | Martins et al. | |
| 11,475,754 B2 | 10/2022 | Hawkins | |
| 2007/0072620 A1 | 3/2007 | Levitan | |
| 2010/0283600 A1 * | 11/2010 | Herbert | G08B 21/0252 |
| | | | 340/539.1 |
| 2014/0355582 A1 * | 12/2014 | Kamath | H04W 84/20 |
| | | | 370/338 |
| 2015/0119077 A1 * | 4/2015 | Buchheim | G01S 5/14 |
| | | | 455/456.1 |
| 2016/0040902 A1 * | 2/2016 | Shah | F24F 11/52 |
| | | | 700/277 |
| 2016/0050530 A1 * | 2/2016 | Corbalis | G06Q 20/3278 |
| | | | 455/456.1 |
| 2016/0099936 A1 * | 4/2016 | Enke | H04W 4/80 |
| | | | 726/7 |
| 2016/0105764 A1 * | 4/2016 | Evans | G08B 21/24 |
| | | | 340/539.13 |
| 2016/0105765 A1 * | 4/2016 | Farley | H04W 4/029 |
| | | | 455/456.1 |
| 2016/0197934 A1 * | 7/2016 | Muraoka | G06F 21/34 |
| | | | 726/7 |
| 2016/0246753 A1 * | 8/2016 | Tan | G06F 13/4282 |
| 2016/0249168 A1 * | 8/2016 | Evans | H04W 4/21 |
| 2017/0223579 A1 * | 8/2017 | Lee | H04W 36/035 |
| 2017/0245108 A1 * | 8/2017 | Slater | H04W 4/021 |
| 2018/0035377 A1 * | 2/2018 | Ueda | H04W 52/0235 |
| 2019/0090119 A1 * | 3/2019 | Ballam | H04W 52/0216 |
| 2019/0208356 A1 * | 7/2019 | Danknick | H04L 67/52 |
| 2019/0209022 A1 | 7/2019 | Sobol et al. | |
| 2019/0362304 A1 * | 11/2019 | Vivas Suarez | G06K 7/00 |
| 2019/0380007 A1 * | 12/2019 | Mahmoud | H04W 4/80 |
| 2020/0106753 A1 * | 4/2020 | Kubo | H04L 12/56 |
| 2020/0107164 A1 | 4/2020 | Lopatin et al. | |
| 2020/0107262 A1 * | 4/2020 | Shaw | H04W 68/02 |
| 2021/0058255 A1 * | 2/2021 | Martins | H04L 9/14 |
| 2021/0092607 A1 * | 3/2021 | Klinkner | H04L 9/14 |
| 2021/0152976 A1 * | 5/2021 | Daoura | H04W 52/0254 |
| 2021/0195415 A1 | 6/2021 | Yang et al. | |
| 2022/0039673 A1 | 2/2022 | Sobol et al. | |
| 2022/0060338 A1 | 2/2022 | Martins et al. | |
| 2022/0103974 A1 * | 3/2022 | De Jong | G06F 3/04886 |
| 2022/0201428 A1 * | 6/2022 | Ertan | G06F 21/44 |
| 2022/0201429 A1 * | 6/2022 | Schoenberg | H04W 4/023 |
| 2022/0360945 A1 | 11/2022 | Lopatin et al. | |
| 2022/0386076 A1 | 12/2022 | Lopatin et al. | |
| 2024/0315572 A1 | 9/2024 | Russek-Sobol et al. | |
| 2025/0009237 A1 | 1/2025 | Russek-Sobol et al. | |

FOREIGN PATENT DOCUMENTS

| | | |
|---|---|---|
| KR | 10-2016-0073622 A | 6/2016 |
| KR | 10-2017-0074348 A | 6/2017 |
| KR | 10-2017-0091708 A | 8/2017 |
| KR | 10-2019-0007162 A | 1/2019 |
| KR | 10-2020-0031275 A | 3/2020 |
| KR | 10-2106083 B1 | 4/2020 |

OTHER PUBLICATIONS

International Search Report dated Feb. 24, 2022, issued in International Application No. PCT/KR2021/016151.

Korean Office Action dated Feb. 13, 2025, issued in Korean Application No. 10-2020-0161351.

Final Rejection dated Oct. 13, 2025, issued in Korean Application No. 10-2020-0161351.

* cited by examiner

100

200

PROCESSOR 300

WIRELESS COMMUNICATION CIRCUIT 310

MEMORY 320

210

ACCESSORY DEVICE

AT LEAST ONE SERVER ～220

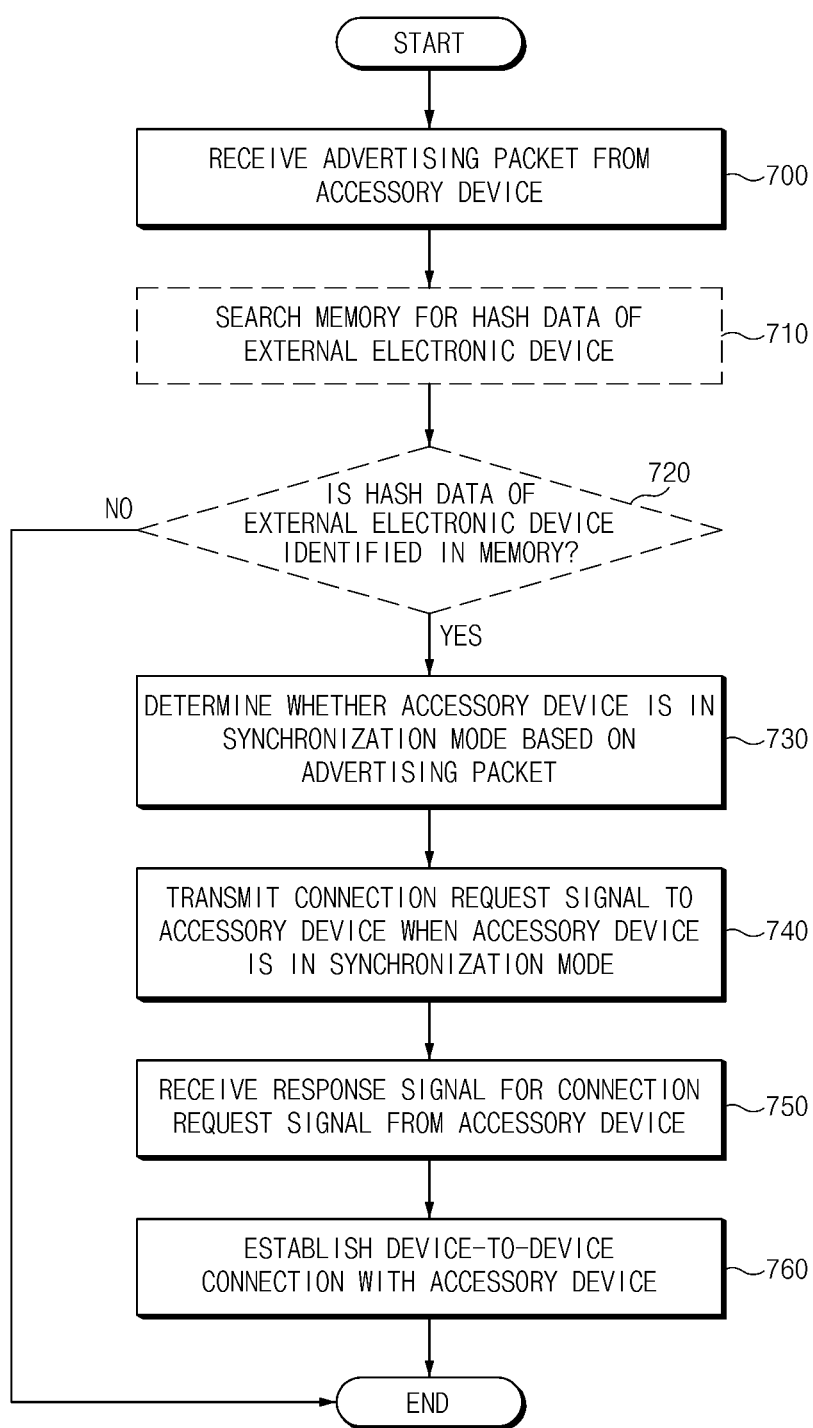

START

RECEIVE ADVERTISING PACKET FROM ACCESSORY DEVICE ~700

SEARCH MEMORY FOR HASH DATA OF EXTERNAL ELECTRONIC DEVICE ~710

IS HASH DATA OF EXTERNAL ELECTRONIC DEVICE IDENTIFIED IN MEMORY? ~720

NO

YES

DETERMINE WHETHER ACCESSORY DEVICE IS IN SYNCHRONIZATION MODE BASED ON ADVERTISING PACKET ~730

TRANSMIT CONNECTION REQUEST SIGNAL TO ACCESSORY DEVICE WHEN ACCESSORY DEVICE IS IN SYNCHRONIZATION MODE ~740

RECEIVE RESPONSE SIGNAL FOR CONNECTION REQUEST SIGNAL FROM ACCESSORY DEVICE ~750

ESTABLISH DEVICE-TO-DEVICE CONNECTION WITH ACCESSORY DEVICE ~760

END

ELECTRONIC DEVICE FOR CONTROLLING POWER CONSUMPTION OF ACCESSORY DEVICE AND OPERATING METHOD THEREFOR

CROSS-REFERENCE TO RELATED APPLICATION(S)

This application is a continuation application, claiming priority under § 365(c), of an International application No. PCT/KR2021/016151, filed on Nov. 8, 2021, which is based on and claims the benefit of a Korean patent application number 10-2020-0161351, filed on Nov. 26, 2020, in the Korean Intellectual Property Office, the disclosure of which is incorporated by reference herein in its entirety.

BACKGROUND

1. Field

The disclosure relates to an electronic device that controls power consumption in an accessory device and a method for operating the same.

2. Description of Related Art

An accessory device (e.g., wireless earphones) powered by a built-in battery may establish a device-to-device connection with an electronic device (e.g., a mobile terminal) that controls an operation of the accessory device. When a user loses the accessory device, the connection between the accessory device and the electronic device may be disconnected. The accessory electronic device whose device-to-device connection with the electronic device has been disconnected may establish a device-to-device connection with a neighboring peripheral device (hereinafter referred to as a neighboring device) (e.g., a mobile terminal). The electronic device may report a cloud (e.g., server) that the accessory device is in a lost state and request location information of the accessory device from the cloud. The neighboring device may receive information of the accessory device through the device-to-device connection and transmit location information of the accessory device to the cloud.

The electronic device may receive the location information of the accessory device from the cloud. The electronic device may inform the user of the location of the accessory device.

The above information is presented as background information only to assist with an understanding of the disclosure. No determination has been made, and no assertion is made, as to whether any of the above might be applicable as prior art with regard to the disclosure.

SUMMARY

After the device-to-device connection with the external electronic device has been disconnected, the accessory device may continue to attempt a device-to-device connection with a neighboring device until the device-to-device connection with the external electronic device is established again.

The accessory device may broadcast an advertising packet for Bluetooth™ Low Energy (BLE) communication at regular intervals. Continuous broadcasting of advertising packets may cause power consumption in the accessory device. When the battery of the accessory device has been exhausted, the external electronic device cannot establish a device-to-device connection with the accessory device at a corresponding location even when the location information of the accessory device is obtained.

When there are a number of neighboring devices around the accessory device, the accessory device may repeatedly perform operations for establishing and disconnecting the device-to-device connection with the plurality of neighboring devices several times. As the number of establishment and disconnection of the device-to-device connection increases, battery consumption in the accessory device may increase. In addition, whenever a device-to-device connection is established, neighboring devices transmit the location information of the accessory device to a server, and thus cloud traffic/cost in a corresponding area may increase.

Aspects of the disclosure are to address at least the above-mentioned problems and/or disadvantages and to provide at least the advantages described below. Accordingly, an aspect of the disclosure is to provide an electronic device that controls power consumption in an accessory device and a method for operating the same.

Additional aspects will be set forth in part in the description which follows and, in part, will be apparent from the description, or may be learned by practice of the presented embodiments.

In accordance with an aspect of the disclosure, an electronic device is provided. The electronic device includes a wireless communication circuit, a memory, and a processor configured to establish a device-to-device connection with an accessory device using the wireless communication circuit, obtain device information of the accessory device through the device-to-device connection, transmit the device information of the accessory device to at least one server, receive state information of the accessory device from the at least one server, transmit location information of the accessory device to the at least one server in response to the state information, and transmit a control command for allowing the accessory device to operate in a low power mode to the accessory device through the device-to-device connection.

In accordance with another aspect of the disclosure, a method of operating an electronic device is provided. The method includes establishing a device-to-device connection with an accessory device, obtaining device information of the accessory device through the device-to-device connection, transmitting the device information of the accessory device to at least one server, receiving state information of the accessory device from the at least one server, transmitting location information of the accessory device to the at least one server in response to the state information, and transmitting a control command for allowing the accessory device to operate in a low power mode to the accessory device through the device-to-device connection.

According to the embodiments disclosed herein, the electronic device may reduce power consumption in an accessory device by allowing the accessory device to operate in a low power mode.

According to the embodiments disclosed herein, the electronic device may reduce power consumption in an accessory device by allowing the accessory device to operate in a desynchronization mode.

In addition, various effects may be provided that are directly or indirectly understood through the disclosure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 is a flowchart for describing device-to-device connection according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
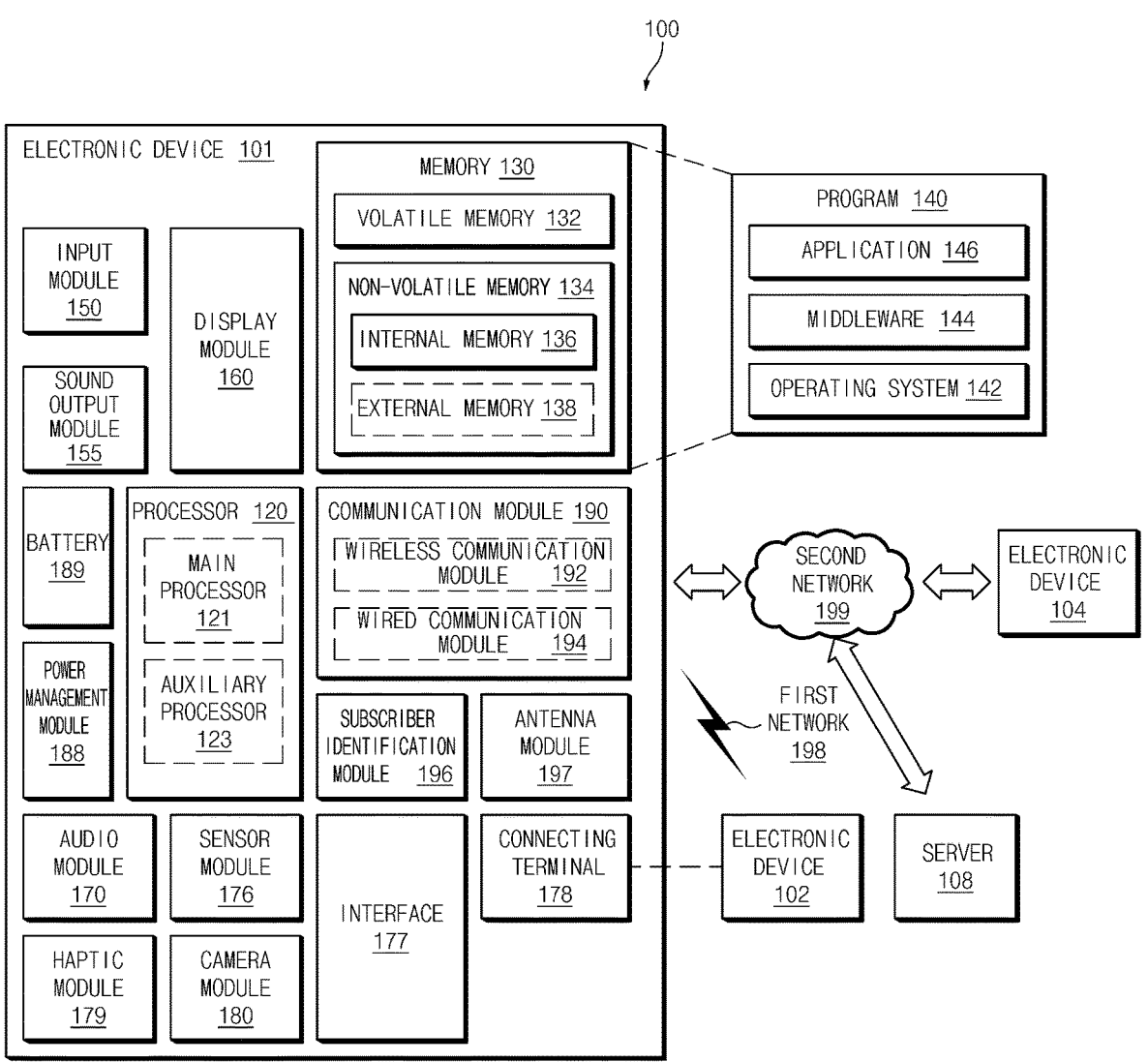
FIG. 1 is a block diagram of an electronic device in a network environment, according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mm Wave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
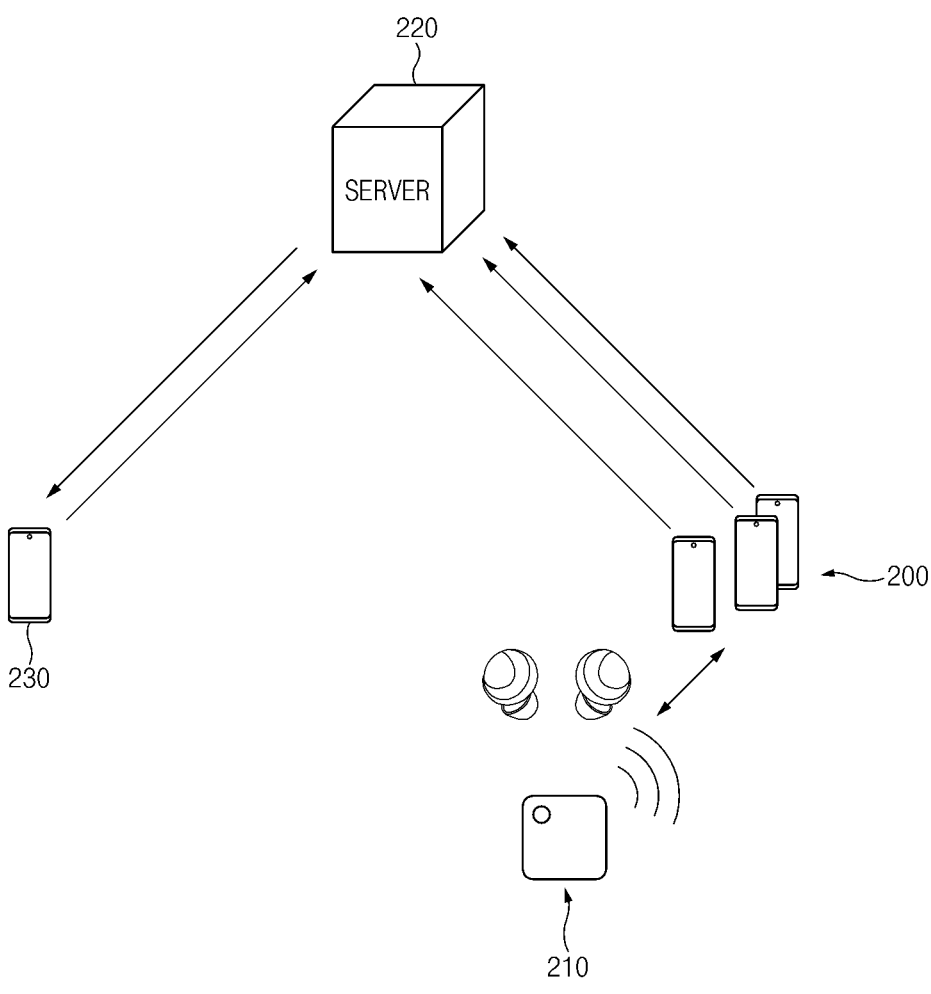
FIG. 2 illustrates signal exchange between electronic devices according to an embodiment of the disclosure.

FIG. 2 illustrates signal exchange between electronic devices according to an embodiment of the disclosure.

According to an embodiment, an external electronic device 230 (e.g., the electronic device 101 of FIG. 1) may perform onboarding of an accessory device 210 (e.g., the electronic device 101 of FIG. 1) on at least one server 220 (e.g., server 108 of FIG. 1). The onboarding refers to an initial setup operation and may include registering, authenticating, or mapping resources of the accessory device 210. The accessory device 210 of the disclosure may be a wireless earphone or a wireless keyboard controlled by an electronic device 200 or the external electronic device 230, but is not limited thereto. For example, the accessory device 210 of the disclosure may include an electronic device (e.g., the electronic device 101 of FIG. 1) such as the electronic device 200 or the external electronic device 230.

When the device-to-device connection (e.g., Bluetooth™ communication) with the accessory device 210 is disconnected, the external electronic device 230 may report the loss of the accessory device 210 to the at least one server 220 and request location information of the accessory device 210.

After the device-to-device connection with the external electronic device 230 is disconnected, the accessory device 210 may establish a device-to-device connection with the neighboring electronic device 200 (e.g., the electronic device 101 of FIG. 1). The electronic device 200 may receive an advertising packet from the accessory device 210 through device-to-device connection. The advertising packet may include device information of the accessory device 210. For example, the device information may include the identification (ID), manufacturer, model name of the accessory device 210, and/or device name set by a user. The electronic device 200 may transmit the device information and location information of the accessory device 210 to the at least one server 220. The at least one server 220 may identify state information of the accessory device 210 based on the device information. For example, when the at least one server 220 receives a report indicating the loss of the accessory device 210 from the external electronic device 230, the at least one server 220 may identify that the accessory device 210 is in a lost state. When the accessory device 210 is in a lost state, the at least one server 220 may transmit the location information of the accessory device 210 to the external electronic device 230.

The external electronic device 230 may receive the location information of the accessory device 210 from the at least one server 220. The external electronic device 230 may inform a user of the location information of the accessory device 210 in various ways. According to an embodiment, the external electronic device 230 may display a location of the accessory device 210 on a map through a display (e.g., the display module 160 of FIG. 1).

According to an embodiment, the user may move to the location of the accessory device 210 together with the external electronic device 230 to find out the accessory device 210. When the external electronic device 230 is located within a certain distance from the accessory device 210, the external electronic device 230 may establish device-to-device connection with the accessory device 210. The user may find out the accessory device 210 using the location information of the accessory device 210 received from the at least one server 220.

According to an embodiment, when the accessory device 210 continuously broadcasts advertising packets to the electronic device 200 or establishes and disconnects device-to-device connection with multiple electronic devices 200, continuous power consumption may occur in the accessory device 210. When the battery of the accessory device 210 is exhausted before the external electronic device 230 approaches the location of the accessory device 210, a user may have difficulty in determining the exact location of the accessory device 210. Also, when the location of the accessory device 210 is continuously changed, the external electronic device 230 may unable to update a change in the location of the accessory device 210.

According to an embodiment, the electronic device 200 may control the operation of the accessory device 210 to reduce power consumption of the accessory device 210. For example, the electronic device 200 may transmit a control command for allowing the accessory device 210 to operate in a low power mode to the accessory device 210 after device information of the accessory device 210 has been transmitted to the at least one server 220. The accessory device 210 may operate in a low power mode by receiving the control command. The low power mode may be understood as an operation mode in which functions other than, for example, a positioning function and a device-to-device connection function are turned off or a broadcasting period for an advertising packet is set longer. According to an embodiment, the electronic device 200 may transmit a control command for allowing the accessory device 210 to operate in a desynchronization mode to the accessory device 210. For example, the accessory device 210 may set the value of a specific flag (e.g., syncReq) included in the advertising packet to zero based on the control command. When receiving the advertising packet, the electronic device 200 may not request a device-to-device connection by identifying the value of the specific flag.

Figure 3:
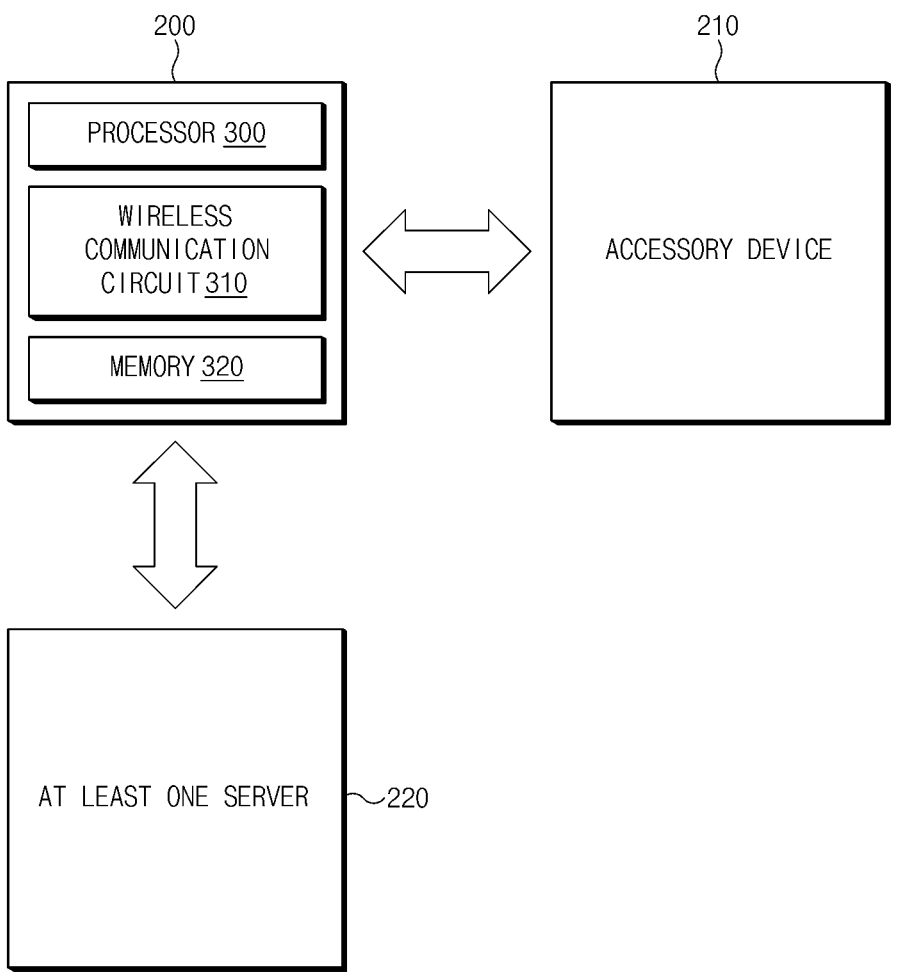
FIG. 3 is a block diagram showing a configuration of an electronic device according to an embodiment of the disclosure.

FIG. 3 is a block diagram showing a configuration of an electronic device according to an embodiment of the disclosure.

According to an embodiment, the electronic device 200 (e.g., the electronic device 101 of FIG. 1) may include a processor 300, a wireless communication circuit 310, and/or a memory 320. The configuration of the electronic device 200 shown of FIG. 3 is an example. For example, the electronic device 200 may further include a battery (e.g., the battery 189 of FIG. 1).

The processor 300 (e.g., the processor 120 of FIG. 1) controls at least one other component (e.g., a hardware or software component) of the electronic device 200 connected to the processor 300 by executing, for example, software (e.g., the program 140 of FIG. 1) and perform various data processing and calculation.

The wireless communication circuit 310 (e.g., the communication module 190 of FIG. 1) may establish a wireless communication channel between the electronic device 200 and an external electronic device (e.g., an accessory device (e.g., 210 of FIG. 2), an external electronic device (e.g., the external electronic device 230 of FIG. 2), or the at least one server 220) and support communication execution through the established communication channel. According to an embodiment, the wireless communication circuit 310 may include, for example, a cellular communication module, a short-range wireless communication module, or a global navigation satellite system (GNSS) communication module.

The memory 320 (e.g., the memory 130 of FIG. 1) may store a variety of data used by the processor 300 of the electronic device 200. The data may include, for example, input data or output data for software (e.g., the program 140 of FIG. 1) and commands related to the software.

The processor 300 may transmit/receive signals with the accessory device 210 and/or the at least one server 220 using the wireless communication circuit 310. According to an embodiment, the electronic device 200 may establish a device-to-device connection with the accessory device 210 and receive device information of the accessory device 210 through the device-to-device connection. The electronic device 200 may transmit the received device information of the accessory device 210 to the at least one server 220. The at least one server 220 may identify a lost state of the accessory device 210, and transmit the location information of the accessory device 210 to an external electronic device (e.g., the external electronic device 230 of FIG. 2) (not shown).

Figure 4:
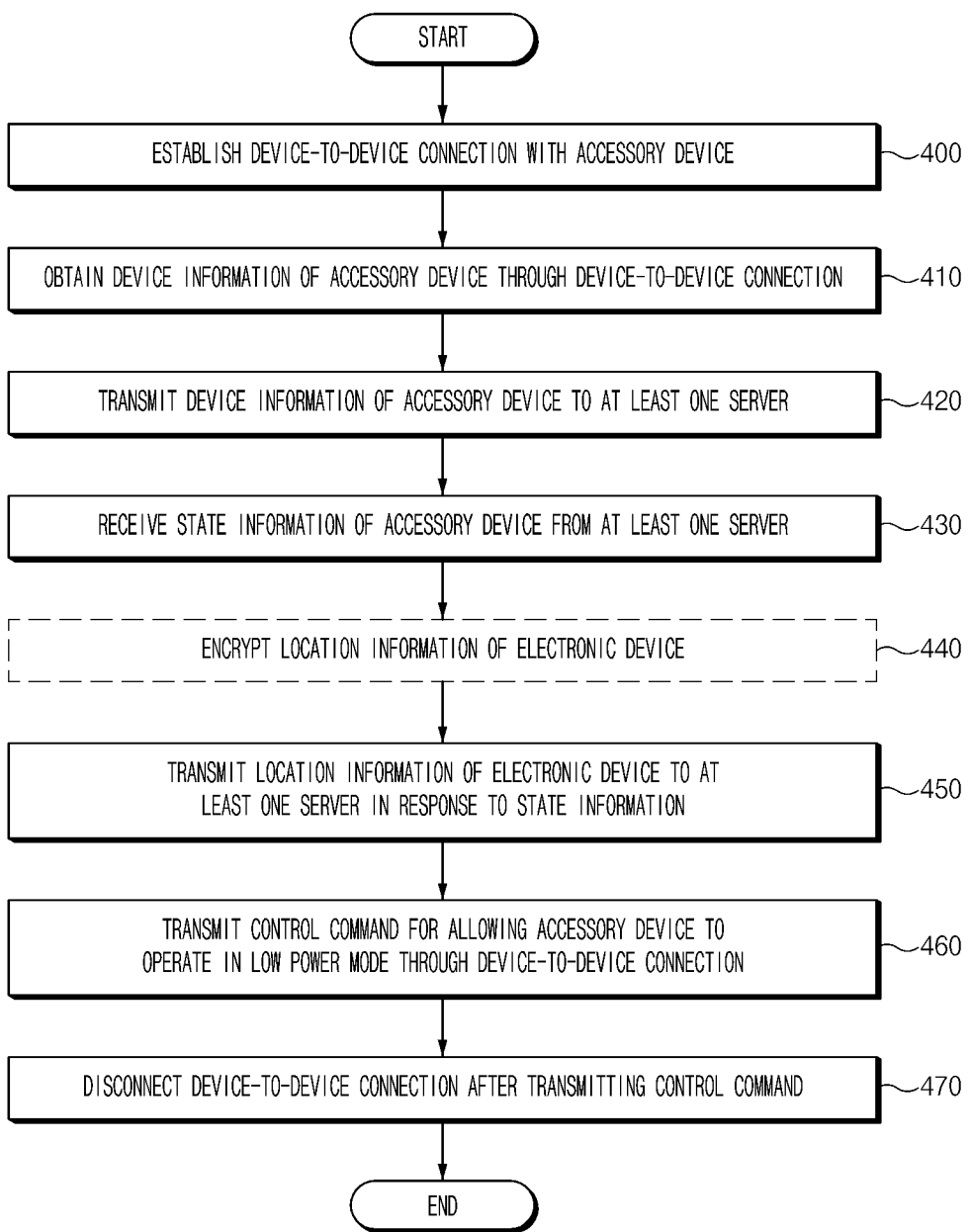
FIG. 4 is a flow chart for describing power control of an accessory device according to an embodiment of the disclosure.

FIG. 4 is a flow chart for describing power control of an accessory device according to an embodiment of the disclosure.

Referring to FIG. 4, in operation 400, a processor (e.g., the processor 300 of FIG. 3) may establish a device-to-device connection with an accessory device (e.g., 210 of FIG. 2) using a wireless communication circuit (e.g., the wireless communication circuit 310 of FIG. 3). The processor 300 may receive an advertising packet from the accessory device 210 or broadcast the advertising packet to the accessory device 210 to establish a device-to-device connection.

In operation 410, the processor 300 may obtain device information of the accessory device 210 through the device-to-device connection. The device information may be understood as unique identification information of the accessory device 210. When the external electronic device (e.g., the external electronic device 230 of FIG. 2) onboards the accessory device 210 onto at least one server (e.g., the at least one server 220 of FIG. 2), the external electronic device may register the device information of the accessory device 210 with the at least one server 220.

In operation 420, the processor 300 may transmit the device information of the accessory device 210 to the at least one server 220. The at least one server 220 may identify state information of the accessory device 210 based on the device information. For example, when the external electronic device 230 reports the at least one server 220 that the accessory device 210 is in a lost state, the at least one server 220 may identify that the accessory device 210 is in a lost state.

In operation 430, the processor 300 may receive state information of the accessory device 210 from the at least one server 220. According to an embodiment, when it is identified that the accessory device 210 is in a lost state, the at least one server 220 may transmit a public key along with the state information.

In operation 440, the processor 300 may encrypt the location information of the accessory device 210 based on the public key. Operation 440 is optional and may be omitted. For example, when the processor 300 fails to receive the public key from the at least one server 220 in operation 430, operation 440 may be omitted.

In operation 450, the processor 300 may transmit the location information of the accessory device 210 to the at least one server 220 in response to the state information. When the location information of the accessory device 210 is encrypted in operation 440, the at least one server 220 may decrypt the received location information. The at least one server 220 may transmit the location information of the accessory device 210 to the external electronic device 230.

In operation 460, the processor 300 may transmit a control command for allowing the accessory device 210 to operate in a low power mode through a device-to-device connection. The accessory device 210 may operate in a low power mode based on the control command. The low power mode may be understood as, for example, an operation mode in which functions other than a positioning function and a device-to-device connection function are turned off or a broadcasting period for an advertising packet is set longer.

In operation 470, the processor 300 may disconnect the device-to-device connection with the accessory device 210 after transmitting the control command. The accessory device 210 may operate in a low power mode for a certain period of time after the device-to-device connection has been disconnected. According to an embodiment, after the certain period of time has elapsed, the accessory device 210 may operate in a general mode. The general mode may be understood as an operation mode in which functions other than, for example, a positioning function and a device-to-device connection function are again turned on or a broadcasting period for an advertising packet is restored to an original broadcasting period. According to an embodiment, when the external electronic device 230 moves to the vicinity of the accessory device 210 and establishes a device-to-device connection with the accessory device 210, the external electronic device 230 may perform control such that the accessory device 210 operates in a general mode.

Figure 5:
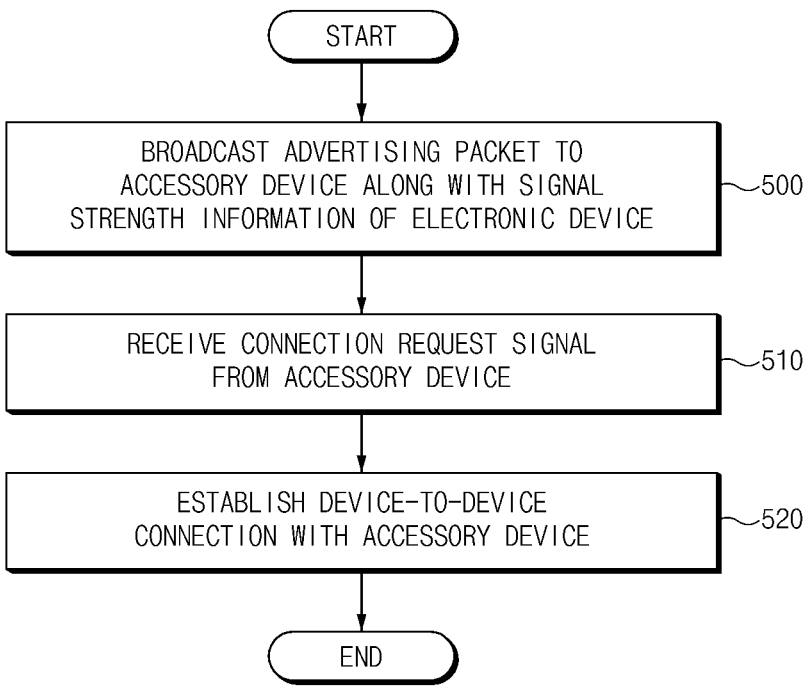
FIG. 5 is a flowchart for describing establishment of a device-to-device connection according to an embodiment of the disclosure.

FIG. 5 is a flowchart for describing establishment of a device-to-device connection according to an embodiment of the disclosure.

Referring to FIG. 5, in operation 500, a processor (e.g., the processor 300 of FIG. 3) may broadcast an advertising packet to the accessory device 210 along with signal strength information of an electronic device (e.g., the electronic device 200 of FIG. 2).

Operation 500 may be performed in response to the processor 300 receiving an inquiry signal from the accessory device 210. The signal strength information may include, for example, RSSI (received signal strength indicator) information. The accessory device 210 may establish a device-to-device connection based on the received signal strength information. For example, the accessory device 210 may receive advertising packets from a plurality of neighboring devices (e.g., the electronic device 200). The accessory device 210 may request a device-to-device connection from a neighboring device having the strongest signal strength based on the received signal strength.

In operation 510, the processor 300 may receive a signal requesting a device-to-device connection from the accessory device 210. In this case, it may be understood that the signal strength of the electronic device 200 is the strongest among the plurality of neighboring devices. The accessory device 210 may transmit a signal requesting a device-to-device connection only to the electronic device 200. Other neighboring devices that do not receive the signal requesting a device-to-device connection may be understood as failing to establish a device-to-device connection. Unlike operation 510, when there is another neighboring device having a stronger signal strength than that of the electronic device 200, the electronic device 200 may not receive a signal requesting a device-to-device connection from the accessory device 210.

In operation 520, the processor 300 may establish a device-to-device connection with the accessory device 210.

The processor 300 may perform the operations of FIG. 4 after establishing the device-to-device connection.

Figure 6:
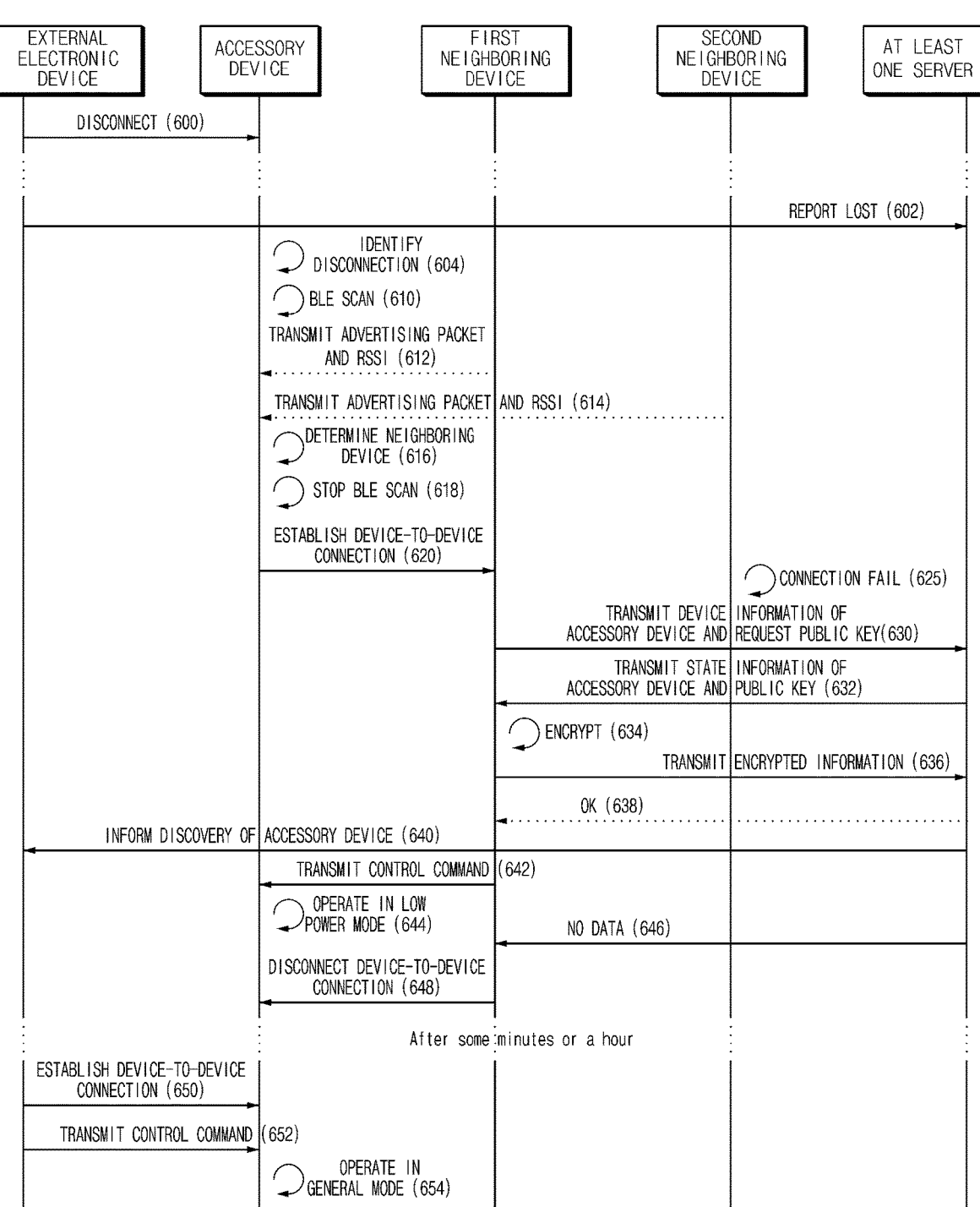
FIG. 6 shows a signal flow diagram according to an embodiment of the disclosure.

FIG. 6 shows a signal flow diagram according to an embodiment of the disclosure.

An external electronic device (e.g., the external electronic device 230 of FIG. 2) may establish a device-to-device connection (e.g., Bluetooth™) with an accessory device (e.g., the accessory device 210 of FIG. 2). The external electronic device 230 may control the accessory device 210 through the device-to-device connection. The external electronic device 230 may onboard the accessory device 210 onto the at least one server 220. For example, the external electronic device 230 may register device information of the accessory device 210 with the at least one server 220.

According to an embodiment, the device-to-device connection between the external electronic device 230 and the accessory device 210 may be disconnected, in operation 600. For example, when a distance between the accessory device 210 and the external electronic device 230 is greater than or equal to a predetermined distance, the device-to-device connection may be disconnected.

When the device-to-device connection is disconnected, the external electronic device 230 may report the loss of the accessory device 210 to the at least one server 220, in operation 602. The at least one server 220 may identify the accessory device 210 as being in a lost state based on the report for the loss of the accessory device 210.

The accessory device 210 may identify the release of the connection with the external electronic device 230, in operation 604. The accessory device 210 may perform a Bluetooth™ low energy (BLE) scan for a device-to-device connection with a neighboring device (e.g., the electronic device 200 of FIG. 2), in operation 610. According to an embodiment, the BLE scan may be performed for a specified period of time at regular intervals. According to an embodiment, when the BLE scan is performed, the accessory device 210 may broadcast an inquiry signal for searching for a neighboring device (e.g., a first neighboring device, a second neighboring device) that supports a BLE function. When receiving the inquiry signal from the accessory device 210, a neighboring device may broadcast an advertising packet.

According to an embodiment, the first neighboring device (e.g., the electronic device 200 of FIG. 2) may broadcast an advertising packet, in operation 612. For example, the first neighboring device may transmit an advertising packet to the accessory device 210. The first neighboring device may transmit received signal strength information (RSSI) together with the advertising packet. According to an embodiment, the second neighboring device (e.g., the electronic device 200 of FIG. 2) may broadcast an advertising packet, in operation 614. For example, the second neighboring device may transmit the advertising packet to the accessory device 210. The second neighboring device may transmit received signal strength information (RSSI) together with the advertising packet.

The accessory device 210 may select one of the neighboring devices based on the received signal strength, in operation 616. For example, the accessory device 210 may select a device having a stronger signal strength from among the first neighboring device and the second neighboring device. The accessory device 210 may stop the BLE scan, in operation 618, and transmit a signal requesting a device-to-device connection to a neighboring device (e.g., a first neighboring device) having a stronger signal strength.

According to an embodiment, the first neighboring device may establish a device-to-device connection with the accessory device 210 in response to the signal requesting a device-to-device connection, in operation 620. When the second neighboring device does not receive the signal requesting a device-to-device connection from the accessory device 210 for a predetermined period of time, the second neighboring device may determine that the device-to-device connection has failed, in operation 625.

The first neighboring device may transmit device information of the accessory device 210 to the at least one server 220 and request a public key, in operation 630. The device information of the accessory device 210 may be obtained through the device-to-device connection. The at least one server 220 may identify the state information of the accessory device 210 based on the device information of the accessory device 210 and then transmit the state information of the accessory device 210 and the public key to the first neighboring device, in operation 632. For example, the at least one server 220 may identify the state information of the accessory device 210 based on the device information. The at least one server 220 may identify the external electronic device 230 as being in a lost state based on a report (e.g., report of operation 602) indicating the loss of the external electronic device 230.

The first neighboring device may encrypt the location information of the accessory device 210 using the public key, in operation 634. According to an embodiment, the first neighboring device may obtain the location information of the first neighboring device as location information of the accessory device 210. According to an embodiment, the first neighboring device may obtain the location information of the accessory device 210 through the device-to-device connection. The first neighboring device may transmit the encrypted location information to the at least one server 220, in operation 636. The at least one server 220 may identify the location information of the accessory device 210 by decrypting the location information.

The at least one server 220 may transmit a confirmation signal to the first neighboring device in response to the signal received in operation 636, in operation 638, and inform the external electronic device 230 that the accessory device 210 has been discovered, in operation 640.

After receiving the confirmation signal in operation 638 from the at least one server 220, the first neighboring device may transmit a control command to the accessory device 210, in operation 642. The control command of operation 642 may be understood as a control command allowing, for example, the accessory device 210 to operate in a low power mode. The accessory device 210 may operate in a low power mode based on the control command, in operation 644. The low power mode may be understood as, for example, an operation mode in which functions other than a positioning function and a device-to-device connection function are turned off or a broadcasting period for an advertising packet is set longer.

When the first neighboring device does not receive an additional signal from the at least one server 220, in operation 646, the first neighboring device may disconnect the device-to-device connection with the accessory device 210, in operation 648.

When the external electronic device 230 moves to a corresponding location based on the location information of the accessory device 210 after a certain period of time has elapsed, the accessory device 210 may establish a device-to-device connection with the external electronic device 230, in operation 650. The external electronic device 230 may transmit a control command for allowing the accessory device 210 to operate in a general mode through the device-to-device connection, in operation 652. The general mode may be understood as an operation mode in which functions other than, for example, a positioning function and a device-to-device connection function are again turned on or a broadcasting period for an advertising packet is restored to an original broadcasting period.

The accessory device 210 may operate in a general mode based on the control command received in operation 652, in operation 654.

FIG. 7 is a flowchart for describing device-to-device connection according to an embodiment of the disclosure.

Referring to FIG. 7, in operation 700, a processor (e.g., the processor 300 of FIG. 3) may receive an advertising packet from an accessory device (e.g., the accessory device 210 of FIG. 2). The advertising packet may include device information of the accessory device 210.

In operation 710, the processor 300 may search a memory (e.g., the memory 320 of FIG. 2) for hash data of an external electronic device (e.g., the external electronic device 230 of FIG. 2). The hash data of the external electronic device 230 may be understood as a unique value generated by the external electronic device 230. The electronic device 200 may receive the hash data from the external electronic device 230 and store the hash data in the memory 320. According to an embodiment, when the electronic device 200 satisfies a specific condition, the external electronic device 230 may transmit the hash data to the electronic device 200. For example, when subscriber identification information (or device information) of the electronic device 200 is included in the contact information of the external electronic device 230, the external electronic device 230 may transmit the hash data to the electronic device 200.

In operation 720, the processor 300 may determine whether the hash data of the external electronic device 230 is identified in the memory 320. When the hash data of the external electronic device 230 is not identified in the memory 320 (i.e., NO in operation 720), the processor 300 may end the operation. When the hash data of the external electronic device 230 is identified in the memory 320 (i.e., YES in operation 720), the processor 300 may proceed to operation 730. Operations 710 and 720 of FIG. 7 are set for conditions for the electronic device 200 capable of establishing a device-to-device connection with the accessory device 210 to enhance security of the operation of the electronic device 200 according to an embodiment. For example, the accessory device 210 may establish a device-to-device connection only with a trusted neighbor device (e.g., the electronic device 200). Operations 710 and 720 of FIG. 7 may be omitted as optional operations. For example, the processor 300 receiving the advertising packet from the accessory device 210 may proceed directly to operation 730 without searching for hash data.

In operation 730, the processor 300 may determine whether the accessory device 210 is in a synchronization mode based on the advertising packet. According to an embodiment, the processor 300 may perform operation 730 by identifying a specific flag of the advertising packet. For example, when the syncReq flag of the advertising packet is 1, the processor 300 may identify that the accessory device 210 is in a synchronization mode.

In operation 740, the processor 300 may transmit a connection request signal to the accessory device 210 when the accessory device 210 is in a synchronization mode.

In operation 750, the processor 300 may receive a response signal to the signal requesting connection from the accessory device 210.

In operation 760, the processor 300 may establish a device-to-device connection with the accessory device 210 based on the response signal.

The processor 300 may perform operations 410 to 470 of FIG. 4 after establishing the device-to-device connection according to operations 700 to 760 of FIG. 7.

Figure 8A:
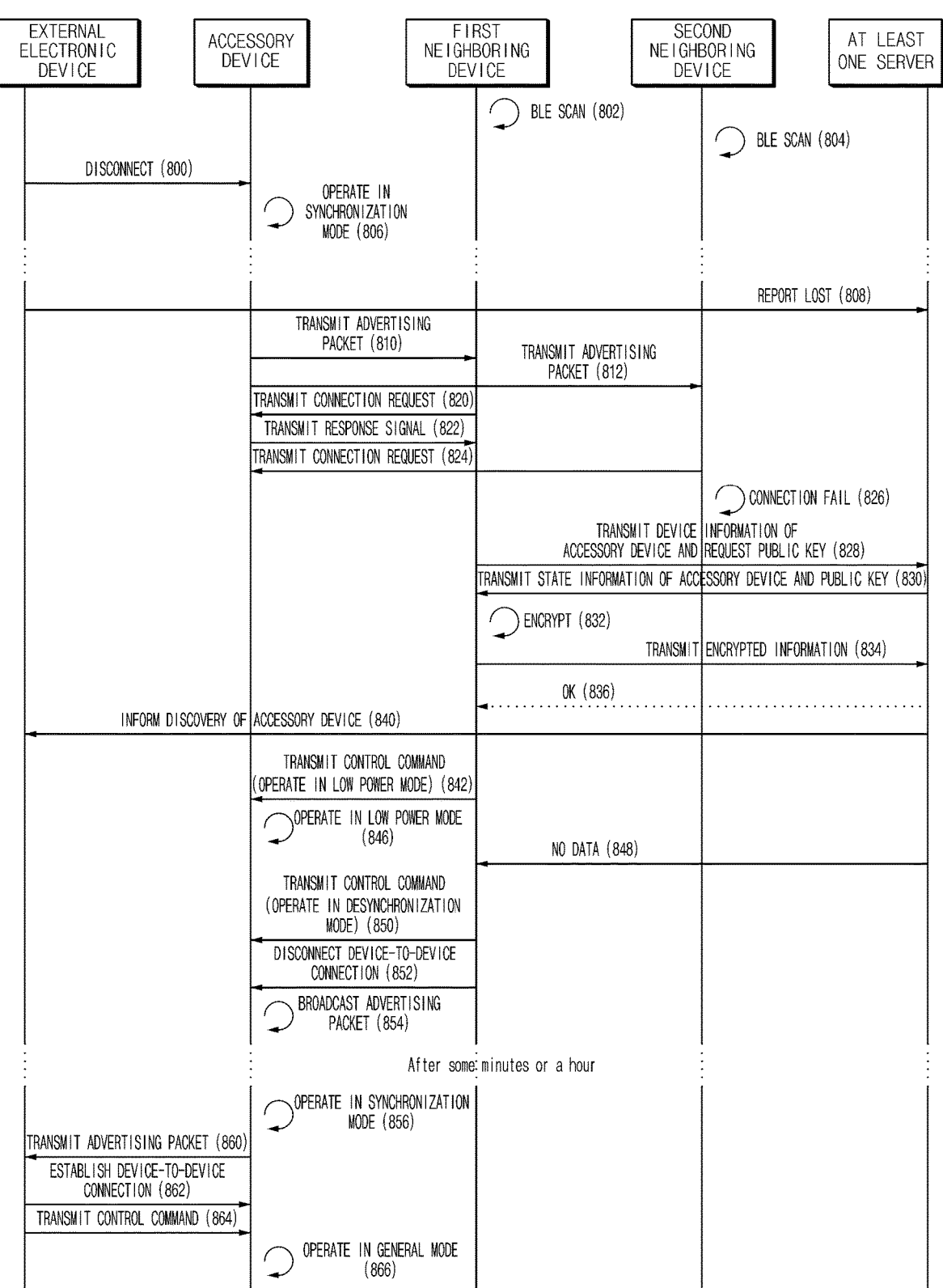
FIG. 8A shows a signal flow diagram according to an embodiment of the disclosure.

FIG. 8A shows a signal flow diagram according to an embodiment of the disclosure.

An external electronic device (e.g., the external electronic device 230 of FIG. 2) may establish a device-to-device connection (e.g., BLE communication) with an accessory device (e.g., the accessory device 210 of FIG. 2). The external electronic device 230 may control the accessory device 210 through the device-to-device connection. The external electronic device 230 may onboard the accessory device 210 onto the at least one server 220. For example, the external electronic device 230 may register device information of the accessory device 210 with the at least one server 220.

According to an embodiment, the device-to-device connection between the external electronic device 230 and the accessory device 210 may be disconnected, in operation 800. For example, when a distance between the accessory device 210 and the external electronic device 230 is greater than or equal to a certain distance, signals for a device-to-device connection may not be transmitted between the accessory device 210 and the external electronic device 230.

A first neighboring device (e.g., the electronic device 200 of FIG. 2) may perform a Bluetooth™ low energy (BLE) scan for connection with another device, in operation 802. A second neighboring device (e.g., the electronic device 200 of FIG. 2) may perform a BLE scan for connection with another device, in operation 804.

When the device-to-device connection with the external electronic device 230 is disconnected, the accessory device 210 may operate in a synchronization mode, in operation 806. According to an embodiment, when the accessory device 210 operates in a synchronization mode, the accessory device 210 may set a specific flag of an advertising packet to a specified value. For example, the accessory device 210 may set a value of the syncReq flag of the advertising packet to one.

When the device-to-device connection is disconnected, the external electronic device 230 may report the loss of the accessory device 210 to the at least one server 220, in operation 808. The at least one server 220 may identify the accessory device 210 as being in a lost state based on the report for the loss of the accessory device 210.

According to an embodiment, the accessory device 210 may broadcast an advertising packet to neighboring devices (a first neighboring device and a second neighboring device) (e.g., the electronic device 200 of FIG. 2), in operations 810 and 812. The advertising packet may include device information of the accessory device 210. The device information of the accessory device 210 may include unique identification information of the accessory device 210. The first neighboring device may receive the advertising packet and transmit a connection request signal to the accessory device 210 in response to the advertising packet, in operation 820. The second neighboring device may receive the advertising packet and transmit a connection request signal to the accessory device 210 in response to the advertising packet, in operation 824.

According to an embodiment, when signals requesting connection are received from a plurality of neighboring devices, the accessory device 210 may transmit a response signal in response to a first-received signal. For example, when a connection request signal is first received from a first neighboring device, the accessory device 210 may transmit a response signal to the first neighboring device, in operation 822. The first neighbor signal may allow a device-to-device connection with the accessory device 210 to be established based on the response signal. The accessory device 210 may not respond to a connection request signal from the second neighboring device received with a lower priority. When the second neighboring device does not receive a response signal for a certain period of time, the second neighboring device may determine that the device-to-device connection with the accessory device 210 has failed, in operation 826.

The first neighboring device may transmit device information of the accessory device 210 to the at least one server 220 and request a public key, in operation 828. The device information of the accessory device 210 may be obtained through the advertising packet. The at least one server 220 may identify the state information of the accessory device 210 based on the device information of the accessory device 210 and then transmit the state information of the accessory device 210 and the public key to the first neighboring device, in operation 830. For example, the at least one server 220 may identify the state information of the accessory device 210 based on the device information. The at least one server 220 may identify the external electronic device 230 as being in a lost state based on a report in operation 808 indicating the loss of the external electronic device 230.

The first neighboring device may encrypt the location information of the accessory device 210 using the public key, in operation 832. According to an embodiment, the first neighboring device may obtain the location information of the first neighboring device as location information of the accessory device 210. According to an embodiment, the first neighboring device may obtain the location information of the accessory device 210 through the device-to-device connection. The first neighboring device may transmit the encrypted location information to the at least one server 220, in operation 834. The at least one server 220 may identify the location information of the accessory device 210 by decrypting the location information.

The at least one server 220 may transmit a confirmation signal indicating that the location information has been received to the first neighboring device in response to receiving the signal in operation 834, in operation 836, and notify the external electronic device 230 that the accessory device 210 has been discovered, in operation 840.

After receiving the confirmation signal in operation 836 from the at least one server 220, the first neighboring device may transmit a control command to the accessory device 210, in operation 842. The control command of operation 842 may be understood as a control command allowing, for example, the accessory device 210 to operate in a low power mode. The accessory device 210 may operate in a low power mode based on the control command, in operation 846. The low power mode may be understood as, for example, an operation mode in which functions other than a positioning function and a device-to-device connection function are turned off or a broadcasting period for an advertising packet is set longer.

When the first neighboring device does not receive an additional signal from the at least one server 220, in operation 848, the first neighboring device may transmit a control command to the accessory device 210, in operation 850. After transmitting the control command in operation 850, the first neighboring device may disconnect the device-to-device connection with the accessory device 210, in operation 852. The control command of operation 850 may be understood as, for example, a control command for allowing the accessory device 210 to operate in a desynchronization mode. The accessory device 210 may operate in a desynchronization mode based on the control command received in operation 850. According to an embodiment, a desynchronization mode may be understood as an operating mode in which the accessory device 210 had not established a device-to-device connection with a neighboring device. The accessory device 210 in the desynchronization mode may set a specific flag of the advertising packet to a specified value. For example, accessory device 210 may set a syncReq value to zero. The accessory device 210 may broadcast an advertising packet after the device-to-device connection with the first neighboring device is disconnected, in operation 854. Upon receiving the advertising packet, the neighboring device may identify that the syncReq value is zero and may not transmit a connection request signal to the accessory device 210.

After a certain period of time has elapsed, the accessory device 210 may operate in a synchronization mode, in operation 856. According to an embodiment, the synchronization mode may be understood as an operation mode in which the accessory device 210 is able to establish a device-to-device connection with a neighboring device. For example, the accessory device 210 may set the syncReq value of the advertising packet back to one.

When the external electronic device 230 moves to a corresponding location based on the location information of the accessory device 210 after a certain period of time has elapsed, the external electronic device 230 may receive an advertising packet which has been broadcast by the accessory device 210, in operation 860. The external electronic device 230 may establish a device-to-device connection with the accessory device 210 based on the received advertising packet, in operation 862. The external electronic device 230 may transmit a control command for allowing the accessory device 210 to operate in a general mode through the device-to-device connection, in operation 864. The general mode may be understood as an operation mode in which functions other than, for example, a positioning function and a device-to-device connection function are again turned on or a broadcasting period for an advertising packet is restored to an original broadcasting period.

The accessory device 210 may operate in a general mode based on the control command received in operation 864, in operation 866.

Figure 8B:
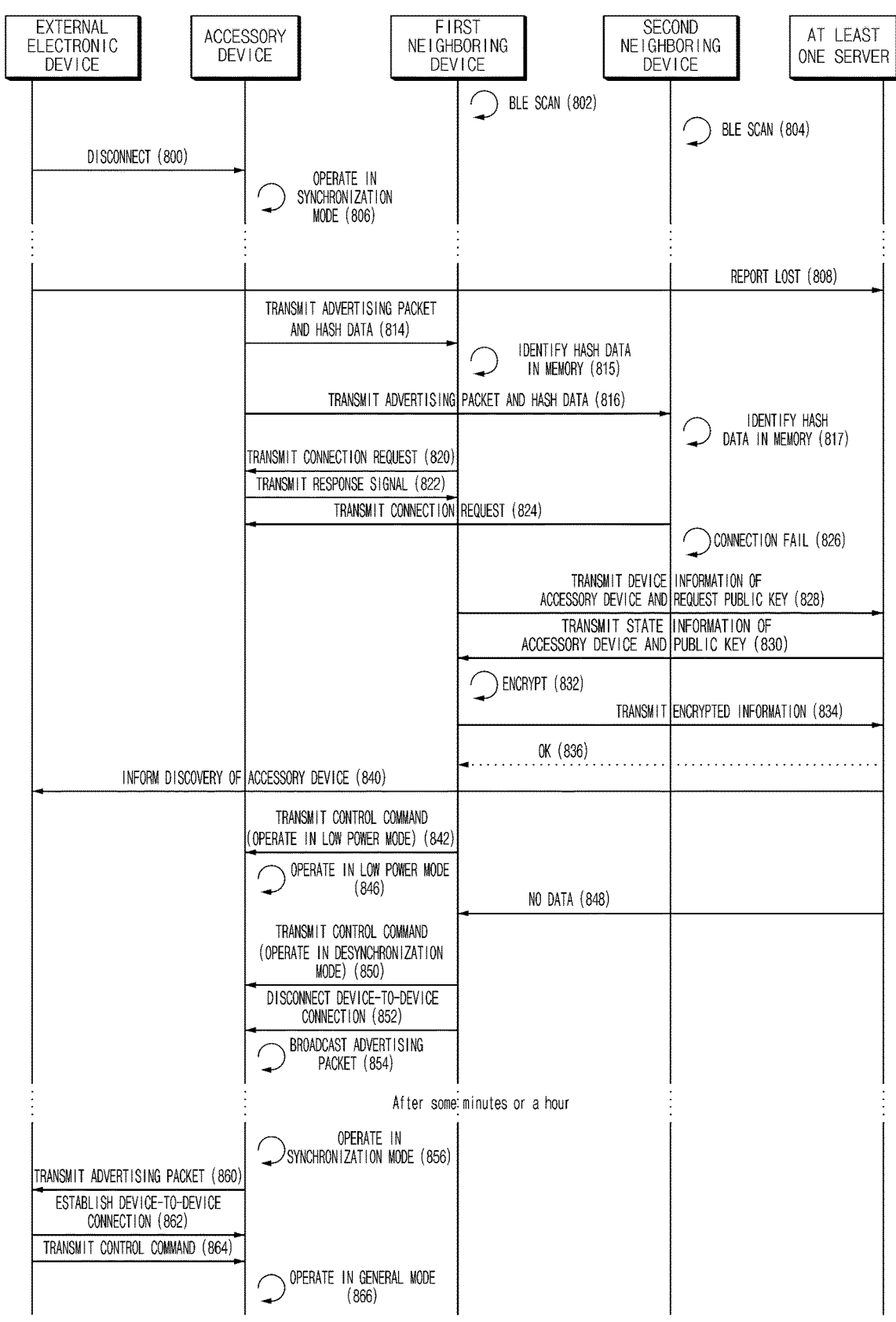
FIG. 8B shows a signal flow diagram according to an embodiment of the disclosure.

FIG. 8B shows a signal flow diagram according to an embodiment of the disclosure.

Descriptions of the same reference numerals as those of FIG. 8A among the reference numerals of FIG. 8B may refer to the descriptions of FIG. 8A. The signal flow diagram of FIG. 8B further includes an operation of identifying hash data in neighboring devices (a first neighboring device and a second neighboring device) in the signal flow diagram of FIG. 8A. A description of the operation of identifying hash data may refer to operations 710 and 720 of FIG. 7.

According to an embodiment, the accessory device 210 may transmit an advertising packet and hash data to a first neighboring device and a second neighboring device after a device-to-device connection has been disconnected, in operations 814 and 816. The hash data may be understood as a unique value generated by the external electronic device 230.

The first neighboring device and the second neighboring device may search a memory (e.g., the memory 320 of FIG. 3) for hash data matching the hash data received from the accessory device 210, in operations 815 and 817. When identifying the hash data matching the received hash data in the memory, the first neighboring device and the second neighboring device may transmit a connection request signal to the accessory device 210, in operations 820 and 824. For example, when the second neighboring device fails to identify the hash data matching the received hash data, the second neighboring device may not transmit the connection request signal in operation 824 to the accessory device 210.

An operation additionally performed in FIG. 8B may be understood as an operation for enhancing security in a device-to-device connection between the accessory device 210 and a neighboring device.

Figure 9:
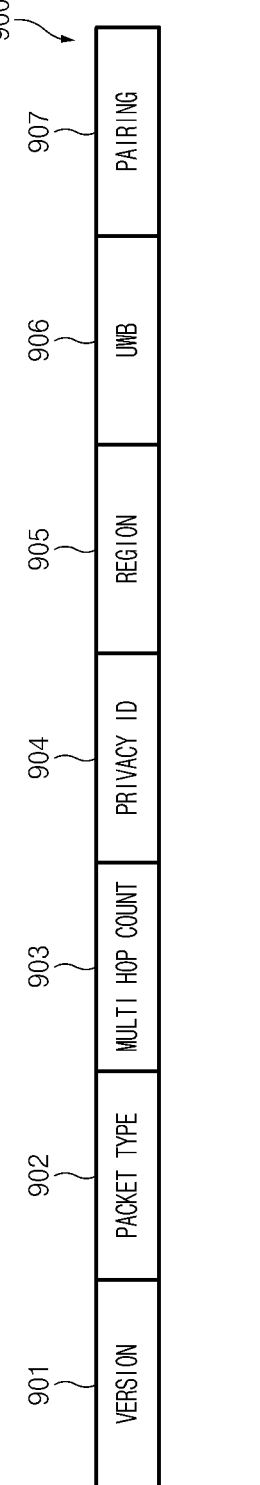
FIG. 9 shows a structure of an advertising packet according to an embodiment of the disclosure.

FIG. 9 shows a structure of an advertising packet according to an embodiment of the disclosure.

An accessory device (e.g., the accessory device 210 of FIG. 2) may generate an advertising packet 900 including device information on the accessory device 210. The accessory device 210 may broadcast the advertising packet 900 based on a specified protocol using a communication circuit (e.g., communication module 190 of FIG. 1). Operations performed by the accessory device 210 may be understood as being performed by a processor (e.g., the processor 120 of FIG. 1) of the accessory device 210.

According to an embodiment, the advertising packet 900 may include a version field 901, a packet type field 902, a multi-hop count field 903, a privacy ID field 904, a region field 905, and an ultra wideband (UWB) field 906, and/or a pairing field 907.

According to one embodiment, the version field 901 may refer to a version of the advertising packet 900. Because the advertising packet 900 are to be based on rules shared between the accessory device 210 that broadcasts the advertising packet 900 and an electronic device that receives and interprets the advertising packet 900 (e.g., the electronic device 200 of FIG. 2), the version of the advertising packet 900 may be used by the electronic device 200 receiving the advertising packet 900 to determine rules for interpreting data included in the advertising packet 900. For example, when the electronic device 200 receives the advertising packet 900 of an old version rather than the latest version, the electronic device 200 may interpret the advertising packet 900 according to a rule corresponding to the old version. For another example, when the version of the electronic device 200 is lower than the version of the advertising packet 900, the electronic device 200 may update the version through at least one server (e.g., the server 108 of FIG. 1).

According to an embodiment, the packet type field 902 may indicate whether the advertising packet 900 is a packet supporting multi-hop. Additionally and/or alternatively, the packet type field 902 may indicate whether the accessory device 210 is currently in an offline mode (e.g., offline finding) or an online mode.

According to an embodiment, the multi-hop count field 903 may indicate how many times the advertising packet 900 has been propagated. For example, when the accessory device 210 directly performs broadcasting, the multi-hop count of the advertising packet 900 may be defined as 0. When another device that has received the advertising packet 900 from the accessory device 210 broadcasts the advertising packet 900 again, the multi-hop count of the advertising packet 900, which has broadcast again, may be defined as one or more numbers.

According to an embodiment, the privacy ID field 904 may be unique identification information of the accessory device 210. Additionally and/or alternatively, the privacy ID field 904 may be a random ID generated according to a predetermined algorithm based on the unique identification information of the accessory device 210.

According to an embodiment, the region field 905 may include country information of the accessory device 210. For example, the region field 905 may be country information received from a server (e.g., the server 108 of FIG. 1) and/or information indicating the address of the server (e.g., the server 108 of FIG. 1) at the time of onboarding of the accessory device 210.

According to an embodiment, the UWB field 906 may indicate whether the accessory device 210 is a device supporting UWB communication. In addition to the UWB, the advertising packet 900 may further include information indicating whether the accessory device 210 supports end to end (E2E) communication or a message communication function (MCF).

According to an embodiment, the pairing field 907 may include information on whether the accessory device 210 is a device that operates alone, or a device that operates as a pair, such as wireless earphones including two or more units, or whether pairing has been achieved when the accessory device 210 is a device operating as a pair.

Figure 10:
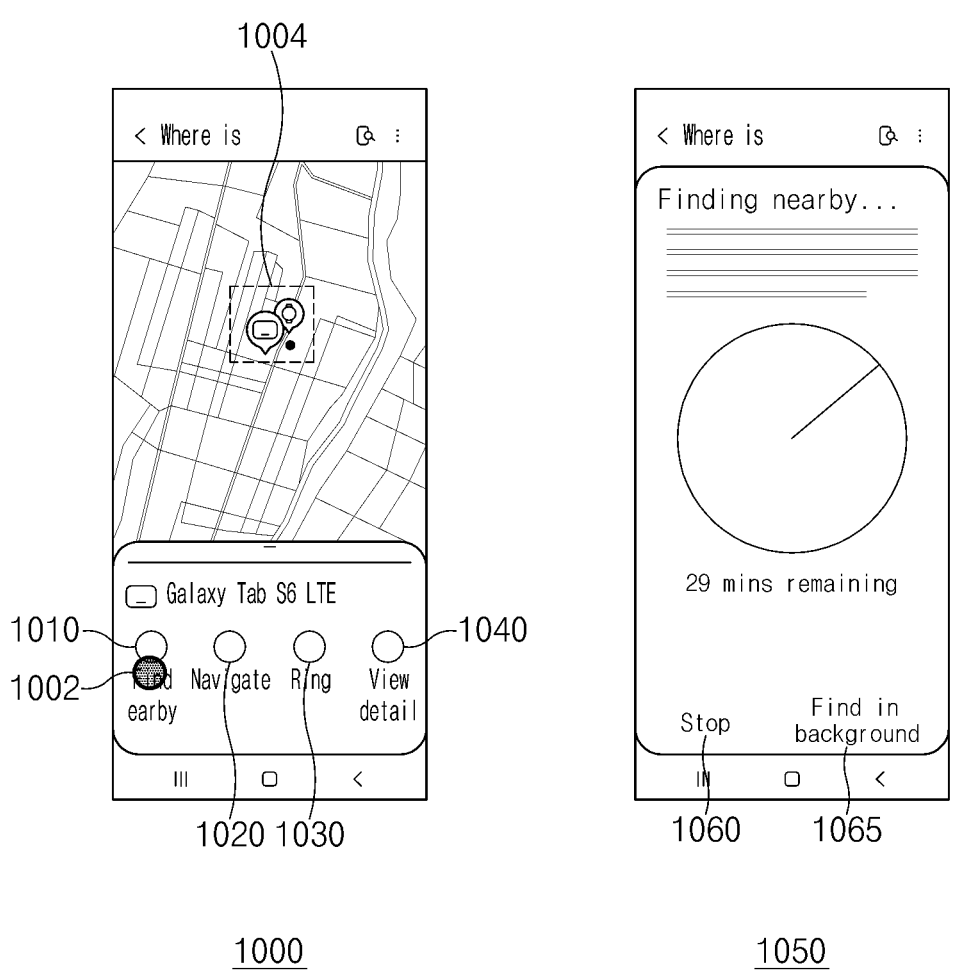
FIG. 10 shows provision of a user interface (UI) according to an embodiment of the disclosure.

FIG. 10 shows provision of a UI according to an embodiment of the disclosure.

According to an embodiment, a user interface (UI) of FIG. 10 may be provided by an external electronic device (e.g., the external electronic device 230 of FIG. 2). When the device-to-device connection with an accessory device (e.g., the accessory device 210 of FIG. 2) is disconnected, the external electronic device 230 may report at least one server (e.g., the at least one server 220 of FIG. 2) that the accessory device 210 is in a lost state. A neighboring device of the accessory device 210 (e.g., the electronic device 200 of FIG. 2) may establish a device-to-device connection with the accessory device 210, and transmit location information of the accessory device 210 to the at least one server 220. The at least one server 220 may transmit the location information of the accessory device 210 to the external electronic device 230.

The external electronic device 230 may inform a user of the received location information of the accessory device 210 in various ways. For example, the external electronic device 230 may provide the location information of the accessory device 210 to the user through voice. For example, the external electronic device 230 may display the location information of the accessory device 210 through a display (e.g., the display module 160 of FIG. 1). Referring to screen 1000, the external electronic device 230 may display a map through the display and mark the locations of the accessory device 210 and the external electronic device 230 together on the map. Reference numeral 1004 may be understood to indicate a location of the accessory device 210 and a location of the external electronic device 230.

According to an embodiment, the UI may provide various functions for finding out the accessory device 210. For example, the UI may include graphic objects 1010, 1020, 1030, and 1040. The UI may receive a user input for the graphic objects 1010, 1020, 1030, and 1040 and execute a corresponding function.

According to an embodiment, the external electronic device 230 may receive a user input 1002 for the graphic object 1010 and display a screen 1050. The user input 1002 may be referred to as a touch input to the display. In screen 1050, the external electronic device 230 may determine whether the accessory device 210 is located around the external electronic device 230 for a specified period of time. For example, the external electronic device 230 may determine whether the accessory device 210 is located within a predetermined distance by scanning a BLE signal. In screen 1050, the external electronic device 230 may stop scanning when receiving a user input for a graphic object 1060. In screen 1050, the external electronic device 230 may perform scanning in the background while executing another function (or application) when receiving a user input for a graphic object 1065.

According to an embodiment, the external electronic device 230 may provide a navigating function for the location of the accessory device 210 on the map when receiving a user input for the graphic object 1020. For example, the external electronic device 230 may plot a route from the current location of the external electronic device 230 (or the user) to the location of the accessory device 210 on the map.

According to an embodiment, the external electronic device 230 may output a specified sound through a sound output device of the accessory device 210 when receiving a user input for the graphic object 1030. For example, when the accessory device 210 establishes a device-to-device connection with the external electronic device 230, the external electronic device 230 may output the specified sound. According to an embodiment, when the accessory device 210 includes the sound output device, the external electronic device 230 may provide a function corresponding to the graphic object 1030.

According to an embodiment, the external electronic device 230 may display detailed information about the accessory device 210 when receiving a user input for the graphic object 1040. For example, the detailed information may include a remaining battery capacity of the accessory device 210, ID information of the accessory device 210, and/or an estimated distance between the accessory device 210 and the external electronic device 230.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a first short range wireless communication circuit;
   a second wireless communication circuit;
   memory storing instructions; and
   one or more processors communicatively coupled to the first short range wireless communication circuit, the second wireless communication circuit, and the memory,
   wherein the instructions, when executed by the one or more processors individually or collectively, cause the electronic device to:
      establish, using the first short range wireless communication circuit, a connection with an external device based on an advertising packet broadcasted for a first broadcasting period from the external device,
      receive, through the connection, device information of the external device,
      transmit, to at least one server, the device information of the external device using the second wireless communication circuit,
      in response to transmitting the device information of the external device, receive, from the at least one server, state information of the external device indicating a state of the external device, based on the state information of the external device, transmit, to the at least one server, location information of the electronic device as location information of the external device, and in response to transmitting the location information of the external device, transmit, to the external device through the connection, a control command for allowing the external device to operate in a low power mode, and wherein the control command allows the external device to operate in an operation mode in which a broadcasting period for the advertising packet is changed to a second broadcasting period longer than the first broadcasting period.

2. The electronic device of claim 1, wherein the instructions, when executed by the one or more processors individually or collectively, further cause the electronic device to:

receive, from the at least one server, a public key associated with the external device, based on the public key, encrypt the location information of the electronic device, and transmit, to the at least one server, the encrypted location information of the electronic device as the location information of the external device.

3. The electronic device of claim 2, wherein the instructions, when executed by the one or more processors individually or collectively, further cause the electronic device to:

receive the advertising packet broadcasted for the first broadcasting period from the external device, and in response to transmitting, to the external device, a connection request signal, establish the connection.

4. The electronic device of claim 3, wherein the instructions, when executed by the one or more processors individually or collectively, further cause the electronic device to:

based on receiving the advertising packet, determine whether the external device is in a synchronization mode in which the external device is able to establish the connection with the electronic device, based on determining that the external device is in the synchronization mode, transmit, to the external device, the connection request signal, and in response to receiving, from the external device, a response signal to the connection request signal, establish the connection.

5. The electronic device of claim 4, wherein the advertising packet includes hash data for the external device, and wherein the instructions, when executed by the one or more processors individually or collectively, further cause the electronic device to:

search the memory for the hash data for the external device, and in response to the hash data for the external device being identified in the memory, establish the connection.

6. The electronic device of claim 2, wherein the instructions, when executed by the one or more processors individually or collectively, further cause the electronic device to:

in response to transmitting the device information of the external device, receive, from the at least one server, the public key of the external device along with the state information of the external device.

7. The electronic device of claim 1, wherein the instructions, when executed by the one or more processors individually or collectively, further cause the electronic device to:

based on the state information indicating that the external device is in a lost state, transmit the location information of the electronic device as the location information of the external device.

8. The electronic device of claim 1, wherein the instructions, when executed by the one or more processors individually or collectively, further cause the electronic device to:

after transmitting the control command for allowing the external device to operate in the low power mode, disconnect the connection.

9. The electronic device of claim 1, wherein the instructions, when executed by the one or more processors individually or collectively, further cause the electronic device to:

transmit, to the external device through the connection, the control command for controlling the external device to operate in the low power mode for a certain period of time.

10. The electronic device of claim 1, wherein the control command allows the external device to operate in an operation mode in which at least one function of the external device other than a connection function with the external device is turned off.

11. A method performed by an electronic device, the method comprising:

establishing, using a first short range wireless communication circuit, a connection with an external device based on an advertising packet broadcasted for a first broadcasting period from the external device;

receiving device information of the external device through the connection;

transmitting, using a second wireless communication circuit, the device information of the external device to at least one server;

in response to transmitting the device information of the external device, receiving, from the at least one server, state information of the external device indicating a state of the external device;

based on the state information of the external device, transmitting, to the at least one server, location information of the electronic device as the location information of the external device; and in response to transmitting the location information of the external device, transmitting, to the external device through the connection, a control command for allowing the external device to operate in a low power mode, wherein the control command allows the external device to operate in an operation mode in which a broadcasting period for the advertising packet is changed to a second broadcasting period longer than the first broadcasting period.

12. The method of claim 11, further comprising:

receiving, from the at least one server, a public key associated with the external device;

based on the public key, encrypting the location information of the electronic device; and transmitting, to the at least one server, the encrypted location information of the electronic device as the location information of the external device.

13. The method of claim 12, further comprising:

receiving the advertising packet broadcasted for the first broadcasting period from the external device; and in response to transmitting, to the external device, a connection request signal, establishing the connection.

14. The method of claim 13, further comprising:

based on receiving the advertising packet, determining whether the external device is in a synchronization mode in which the external device is able to establish the connection with the electronic device;

based on determining that the external device is in the synchronization mode, transmitting, to the external device, the connection request signal; and in response to receiving, from the external device, a response signal to the connection request signal, establishing the connection.

15. The method of claim 14, wherein the advertising packet includes hash data for the external device, and wherein the method further comprises:

searching for the hash data for the external device; and in response to the hash data for the external device being identified, establishing the connection.

16. The method of claim 12, further comprising:

after transmitting the control command for allowing the external device to operate in the low power mode, disconnecting the connection.

17. The method of claim 11, further comprising:

based on the state information indicating that the external device is in a lost state, transmitting the location information of the electronic device as the location information of the external device.

18. The method of claim 11, further comprising:

receiving, from the at least one server, a public key of the external device along with the state information of the external device;

based on the public key of the external device, encrypting location information of the electronic device to generate encrypted location information of the electronic device; and transmitting, to the at least one server, the encrypted location information of the electronic device.

19. The method of claim 11, further comprising:

transmitting, to the external device through the connection, the control command for allowing the external device to operate in the low power mode for a certain period of time.

* * * * *